United States Patent
Seo et al.

(10) Patent No.: US 10,089,031 B2
(45) Date of Patent: Oct. 2, 2018

(54) DATA STORAGE AND OPERATING METHOD THEREOF

(71) Applicant: SAMSUNG ELECTRONICS CO., LTD., Suwon-si, Gyeonggi-do (KR)

(72) Inventors: Sungyong Seo, Seongnam-si (KR); Yeong-Jae Woo, Suwon-si (KR); MoonSang Kwon, Seoul (KR); Sunmi Lee, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 179 days.

(21) Appl. No.: 15/019,419

(22) Filed: Feb. 9, 2016

(65) Prior Publication Data

US 2016/0299722 A1 Oct. 13, 2016

(30) Foreign Application Priority Data

Apr. 13, 2015 (KR) ........................ 10-2015-0051912

(51) Int. Cl.
*G06F 12/10* (2016.01)
*G06F 3/06* (2006.01)
*G06F 12/02* (2006.01)

(52) U.S. Cl.
CPC ............ *G06F 3/0631* (2013.01); *G06F 3/064* (2013.01); *G06F 3/0608* (2013.01); *G06F 3/0617* (2013.01); *G06F 3/0665* (2013.01); *G06F 3/0679* (2013.01); *G06F 12/0261* (2013.01); *G06F 2212/7205* (2013.01)

(58) Field of Classification Search
CPC ..... G06F 3/0631; G06F 3/0679; G06F 3/0665

USPC ......................................................... 711/102
See application file for complete search history.

(56) References Cited

U.S. PATENT DOCUMENTS

| | | | |
|---|---|---|---|
| 6,078,520 A | 6/2000 | Torita et al. | |
| 7,009,896 B2 | 3/2006 | Yoon et al. | |
| 7,453,712 B2 | 11/2008 | Kim et al. | |
| 7,571,277 B2 | 8/2009 | Mizushima | |
| 7,679,133 B2 | 3/2010 | Son et al. | |
| 8,001,356 B2 | 8/2011 | Im et al. | |
| 8,060,687 B2 | 11/2011 | Yuan et al. | |
| 8,327,066 B2 | 12/2012 | Heo et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,626,288 B2 * | 4/2017 | Danilak | G06F 12/0246 |

(Continued)

FOREIGN PATENT DOCUMENTS

| | | |
|---|---|---|
| JP | 2006-107363 | 4/2006 |
| JP | 2008-171103 | 7/2008 |

(Continued)

*Primary Examiner* — Jae Yu
(74) *Attorney, Agent, or Firm* — F. Chau & Associates, LLC

(57) ABSTRACT

Data storage is provided which includes a nonvolatile memory device including a plurality of memory blocks divided into a first region being an over provisioning region and a second region, and a storage controller allocating at least one memory block, corresponding to an unconcerned sector, from among memory blocks of the second region to the first region. It may be possible to adjust the number of reserved memory blocks in the over provisioning region.

18 Claims, 15 Drawing Sheets

(56) References Cited

U.S. PATENT DOCUMENTS

| | | | |
|---|---|---|---|
| 2001/0050442 A1* | 12/2001 | Lee | ........................ H01L 27/115 |
| | | | 257/315 |
| 2009/0271564 A1 | 10/2009 | Sugimoto et al. | |
| 2010/0205354 A1 | 8/2010 | Suzuki | |
| 2011/0233648 A1 | 9/2011 | Seol et al. | |
| 2012/0005451 A1 | 1/2012 | Lee et al. | |

FOREIGN PATENT DOCUMENTS

| | | |
|---|---|---|
| KR | 10-0745204 | 7/2007 |
| KR | 10-0925523 | 10/2009 |
| KR | 1020120003283 | 1/2012 |

\* cited by examiner

DATA STORAGE AND OPERATING METHOD THEREOF

CROSS-REFERENCE TO RELATED APPLICATIONS

This U.S. non-provisional patent application claims priority under 35 U.S.C. § 119 to Korean Patent Application No. 10-2015-0051912, filed on Apr. 13, 2015, in the Korean Intellectual Property Office, the disclosure of which is incorporated by reference in its entirety herein.

BACKGROUND

1. Technical Field

Embodiments of the inventive concepts described herein relate to data storage, and more particularly, relate to data storage capable of adjusting a capacity of an over provisioning region.

2. Discussion of Related Art

A solid state drive (SSD) is a solid-state storage device that uses integrated circuit assemblies as memory to store data persistently. The SSD may include a region for storing data and an over provisioning region. The over provisioning region may be used for maintenance of the SSD.

If a region of the data storage where data is stored is close to running out of storage space and the over provisioning region is close to running out of reserved memory blocks, the data storage may enter a write-protected mode. That is, in the write-protected mode, a data read operation is possible (e.g., a read-only mode) and a write operation is not impossible. If a user manually deletes one or more file(s) in the region where data is stored, the data storage can exit the write protected mode. However, it may be inefficient to rely on such intervention from the user.

SUMMARY

An embodiment of the inventive concept is directed to adjusting the number of reserved memory blocks belonging to an over provisioning region of data storage, thereby preventing a write-impossible state caused when the data storage enters a write-protected mode.

An embodiment of the inventive concept is directed to restoring a memory block allocated to an over provisioning region to a non-over provisioning region, thereby making it possible to extend a data storage space.

According to an exemplary embodiment of the inventive concept, a data storage device includes a nonvolatile memory device including a plurality of memory blocks divided into a first region which is an over provisioning region and a second region for storing data, and a storage controller configured to allocate at least one memory block, corresponding to an unconcerned sector, from among memory blocks of the second region to the first region. The first and second regions are distinct from one another.

The storage controller may provide a host with status information of the first region in response to a command from the host.

In an embodiment, the status information indicates one of a number of reserved memory blocks of the first region and a degree of risk of entering into a write-protected mode, and in the write-protected mode, the data storage operates in a read-only mode.

In an embodiment, the unconcerned sector is set when the number of reserved memory blocks is smaller than a reference value, and the reserved memory blocks are used for maintenance of the data storage including at least one of TRIM, garbage collection, and replacement of a bad block.

The storage controller may perform a garbage collection operation on memory blocks of the second region using at least one memory block allocated to the first region.

Information indicating which sector of the second region corresponds to the unconcerned sector may be received from the host.

The storage controller may allocate the at least one memory block, corresponding to the unconcerned sector, to the first region by invalidating a mapping relationship between logical and physical addresses corresponding to the unconcerned sector.

In an embodiment, the storage controller restores at least one memory block to the second region by validating a mapping relationship between a logical address, corresponding to a restoration sector, and a physical address of the at least one memory block to be restored. In this embodiment, the restoration sector is set based on a use rate of a file system by a host.

The restoration sector may correspond to at least one memory block to be restored to the second region among memory blocks included in the first region.

The over provisioning region may be used for maintenance of the data storage including at least one of TRIM, garbage collection, and replacement of a bad block, and data not used by a file system of a host may be stored at the at least one memory block corresponding to the unconcerned sector.

According to an exemplary embodiment of the inventive concept, a method of operating a data storage device includes providing a host with status information of a first region of a nonvolatile memory device allocated for over provisioning in response to a command from the host, and allocating at least one memory block, corresponding to an unconcerned sector to the first region, from among remaining memory blocks of a second region of the nonvolatile memory device. The first and second regions are distinct from one another.

The status information may include at least one of the number of reserved memory blocks of the first region or a degree of risk of entering into a write-protected mode, and the unconcerned sector may be set when the number of reserved memory blocks is smaller than a reference value.

The method may further include performing a garbage collection operation on memory blocks of the second region using at least one memory block allocated to the first region.

The method may further include decreasing the number of reserved memory blocks of the first region based on a use rate of a file system of the host, and the number of the reserved memory blocks may decrease as the use rate of the file system increases.

The nonvolatile memory device may be a three-dimensional nonvolatile memory device in which a memory cell string is formed to be perpendicular to a substrate.

According to an exemplary embodiment of the inventive concept, a storage system includes a host, and a data storage device including a nonvolatile memory device and a storage controller configured to control the nonvolatile memory device and configured to transfer status information of the nonvolatile memory device to the host. The nonvolatile memory device includes a first region being an over provisioning region and a second region being a remaining region other than the first region. The host determines whether it needs to select an unconcerned sector based on the status information and transfers information on the unconcerned sector to the storage controller based on the determination.

The storage controller allocates at least one memory block of the second region, corresponding to the unconcerned sector, to the first region.

The status information may indicate a number of reserved memory blocks of the first region or a degree of risk of entering into a write-protected mode.

The host may set the unconcerned sector when the number of reserved memory blocks is smaller than a reference value.

The storage controller may perform a garbage collection operation on memory blocks of the second region using at least one memory block allocated to the first region.

The nonvolatile memory device may be a three-dimensional nonvolatile memory device in which a memory cell string is formed to be perpendicular to a substrate.

According to an exemplary embodiment of the inventive concept, a storage device includes a nonvolatile memory device having distinct first and second regions; and a storage controller configured to perform over provisioning operations on the first region and blocks of the second region allocated to the first region, and normal data storage operations on the second region. The storage controller allocates a memory block of the second region storing unused data to the first region when the storage controller determines that the data storage device is about to enter a write protected mode.

In an embodiment, the storage controller determines that the storage device is about to enter the write protected mode when a number of reserved blocks of the first region is below a threshold. In an embodiment, the storage device receives information from an outside host indicating which memory block of the second region corresponds to the memory storing the unused data. In an embodiment, the memory block of the second region is allocated to the first region by invalidating a mapping of a logical address to a physical address associated with the allocated memory block.

BRIEF DESCRIPTION OF THE FIGURES

Exemplary embodiments of the inventive concept will become apparent from the following description with reference to the following figures, wherein like reference numerals refer to like parts throughout the various figures unless otherwise specified, and wherein.

DETAILED DESCRIPTION OF THE EXEMPLARY EMBODIMENTS

Figure 1:
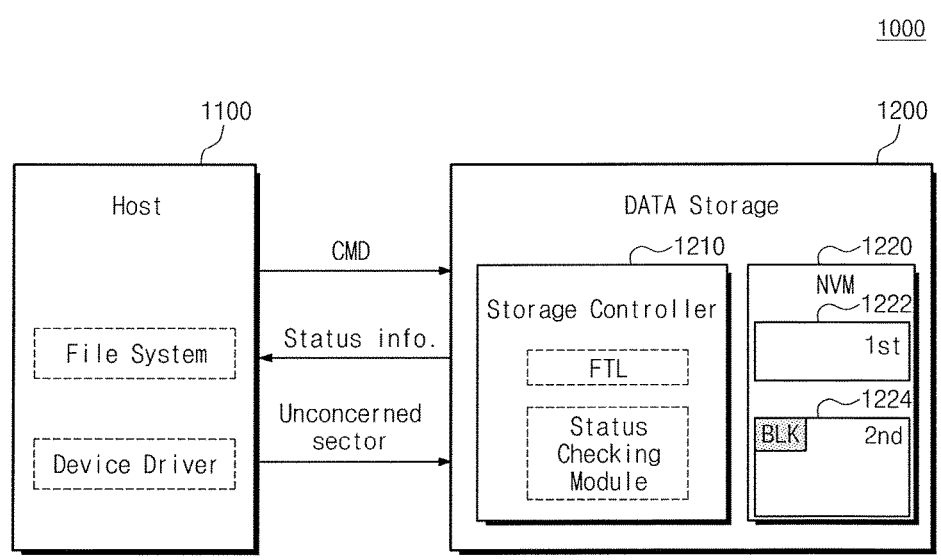
FIG. 1 is a block diagram schematically illustrating a storage system according to an exemplary embodiment of the inventive concept.

The inventive concept will now be described more fully hereinafter with reference to the accompanying drawings, in which exemplary embodiments of the inventive concept are shown. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Unless otherwise noted, like reference numerals denote like elements throughout the attached drawings and written description, and thus certain descriptions will not be repeated.

In addition, it will also be understood that when a layer is referred to as being "between" two layers, it can be the only layer between the two layers, or one or more intervening layers may also be present. As used herein, the singular forms "a", "an" and "the" are intended to include the plural forms as well, unless the context clearly indicates otherwise.

It will be understood that when an element or layer is referred to as being "on", "connected to", "coupled to", or "adjacent to" another element or layer, it can be directly on, connected, coupled, or adjacent to the other element or layer, or intervening elements or layers may be present.

In the description below, it will be understood that when an element such as a layer, region, substrate, plate, or member is referred to as being "on" another element, it can be directly on the other element or intervening elements may be present.

In an embodiment of the present inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the present inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Below, an embodiment of the inventive concept will be more fully described with reference to accompanying drawings.

FIG. 1 is a block diagram schematically illustrating a storage system 1000 according to an exemplary embodiment of the inventive concept. Referring to FIG. 1, a storage system 1000 includes a host 1100 and data storage 1200. The data storage 1200 includes a storage controller 1210 and a nonvolatile memory device 1220.

The host 1100 may send a command for requesting status information of the nonvolatile memory device 1220 to the data storage 1200. The data storage 1200 may transfer the status information of the nonvolatile memory device 1220 to the host 1100 in response to the received command. For example, the status information may indicate at least one of the number of reserved memory blocks of an over provisioning region 1222 (i.e., a first region) or a degree of risk associated with entering into a write-protected mode. In an exemplary embodiment, a reserved memory block is a memory block that is used for maintenance of the data storage 1200 such as TRIM, garbage collection, replacement of bad blocks, etc., but is not limited thereto.

TRIM, also referred to as a TRIM command, allows an operating system to inform a solid-state drive (SSD) which blocks of data are no longer considered in use and can be wiped internally. Garbage collection is the name for the process of relocating existing data to new locations and allowing the surrounding invalid data to be erased. Replacement of a bad block means that it has been determined that a block of the memory unreliable and thus the bad block is replaced with a new block of memory that is considered more reliable. For example, data destined for the bad block is instead stored in the new block and all references to the bad block are replaced with references to the new block.

The host 1100 may determine whether the data storage 1200 intends to enter a write-protected mode, based on the received status information. If the over provisioning region 1222 of the nonvolatile memory device 1220 is about to run out of reserved memory blocks, this may indicate that the data storage 1200 intends to enter the write-protected mode at once. For example, the host 1100 could determine that the nonvolatile memory device 1120 is about to run out of reserved memory blocks when the number of empty or unused reserved blocks in the over provisioning region 1222 falls below a certain threshold. For example, an empty or unused reserved block is a block that is not currently being used for an over provisioning operation, has not been allocated to non-over provisioning region, and is ready to be used for a next over provisioning operation. Accordingly, it may be necessary to prevent the data storage 1200 from entering a write-impossible state due to entering into the write-protected mode. Alternatively, if the data storage 1200 has already entered the write-protected mode, it may be necessary to secure one or more reserved memory block(s) of the over provisioning region to exit from the write-protected mode. Ideally the reserved memory blocks are secured without relying on intervention from a user deleting one or more files from the non-over provisioning region to secure a free space.

If the data storage 1200 has entered the write-protected mode or intends to enter the write-protected mode, the host 1100 transfers information associated with an unconcerned sector to the data storage 1200. In an embodiment, the unconcerned sector is a sector, which corresponds to a specific memory block of the nonvolatile memory device 1220 in which unused or unnecessary data is stored. The unused or unnecessary data is stored in the non-over provisioning region (i.e., that region that is designed to store data and not used for performing over provisioning operations). That is, it may be possible to arbitrarily erase data, which is stored at a memory block of the nonvolatile memory device 1220 corresponding to the unconcerned sector. A region corresponding to the unconcerned region is illustrated in FIG. 1 as being a shaded memory block BLK. The host 1100 selects an unconcerned sector from the non-provisioning region 1224 and transfers a logical address (e.g., a logical page number (LPN)), corresponding to the selected unconcerned sector, to the data storage 1200. The data storage 1200 can determine the unconcerned sector using the received logical address.

The storage controller 1210 applies information on the unconcerned sector received from the host 1100 to a mapping table to allocate a memory block to the over provisioning region 1222. The storage controller 1210 may execute a garbage collection operation on the non-provisioning region (i.e., the second region 1224). As a result of the garbage collection operation, if a sufficient number of free blocks are secured at the second region 1224, the data storage 1200 may exit the write-protected mode or delays entering into the write-protected mode for a substantial amount of time. Here, the free blocks may be physically erased memory blocks.

According to an exemplary embodiment of the inventive concept, it is possible to adjust the number of reserved memory blocks belonging to the over provisioning region 1222 of the data storage 1200, thereby preventing the data storage 1200 from entering a write-impossible state due to entering into the write-protected mode.

Figure 2:
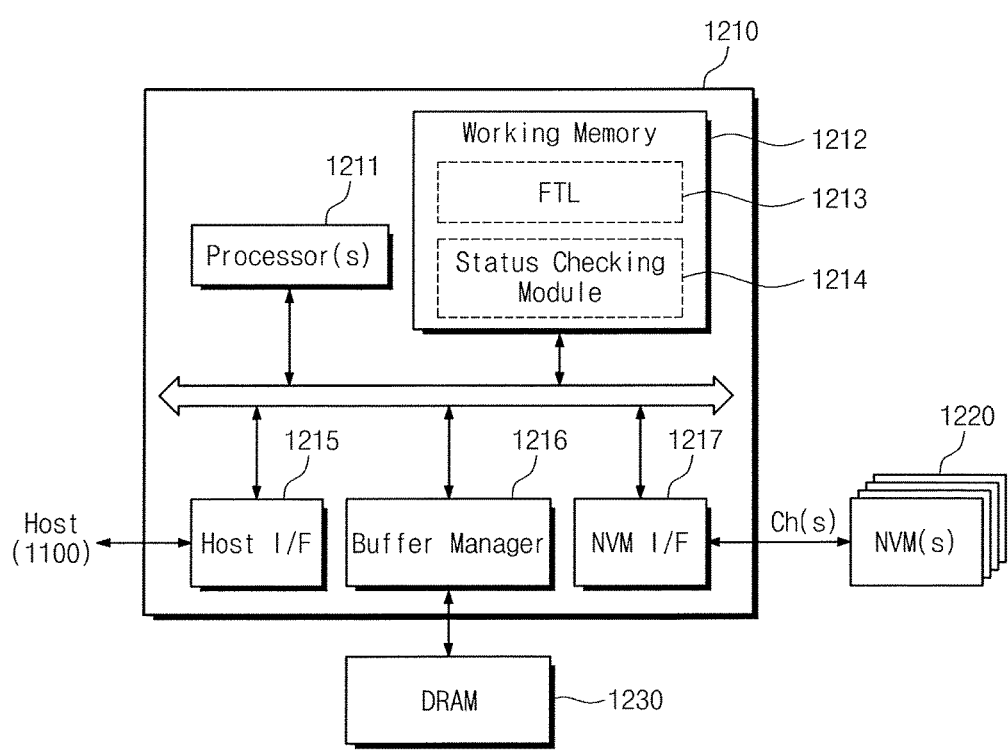
FIG. 2 is a block diagram schematically illustrating data storage illustrated in FIG. 1.

FIG. 2 is a block diagram schematically illustrating data storage 1200 illustrated in FIG. 1. Referring to FIG. 2, data storage 1200 includes a storage controller 1210, a nonvolatile memory device 1220, and a buffer 1230. The nonvolatile memory device 1220 may include one or more nonvolatile memories. The storage controller 1210 includes at least one processor 1211, a working memory 1212, a host interface 1215, a buffer manager 1216, and a nonvolatile memory interface 1217.

The processor 1211 may control an overall operation of the storage controller 1210. The processor 1211 may run firmware for driving the storage controller 1210. The firmware may be loaded and driven on the working memory 1212. The firmware may include a flash translation layer (FTL) and a status checking module.

The working memory 1212 may be used to load firmware, software for controlling the storage controller 1210. For example, the FTL and the status checking module may be loaded onto the working memory 1212. The working memory 1212 may include at least one of a cache memory, a dynamic random access memory (DRAM), a static random access memory (SRAM), a phase-change RAM (PRAM), or a flash memory device.

The host interface 1215 may provide an interface between a host 1100 and the storage controller 1210. The host 1100 and the storage controller 1210 may be connected through at least one of various standardized interfaces. The standardized interfaces may include various interfaces, such as ATA (Advanced Technology Attachment), SATA (Serial ATA), e-SATA (external SATA), SCSI (Small Computer Small Interface), SAS (Serial Attached SCSI), PCI (Peripheral component Interconnection), PCI-E (PCI Express), USB (Universal Serial Bus), IEEE 1394, and card interfaces.

The buffer manager 1216 may provide an interface between the storage controller 1210 and the buffer 1230. Data to be stored at the nonvolatile memory device 1220 or read out from the nonvolatile memory device 1220 may be temporarily stored at the buffer 1230 through the buffer manager 1216 (or under a control of the buffer manager 1216).

The nonvolatile memory interface 1217 may provide an interface between the storage controller 1210 and the nonvolatile memory device 1220. For example, the storage controller 1210 may exchange data with the nonvolatile memory device 1220 through the nonvolatile memory interface 1217.

The nonvolatile memory device 1220 may be a three-dimensional nonvolatile memory device in which memory cell strings (or a string including serially connected memory cells) are formed to be vertical to a substrate. However, the scope and spirit of the inventive concept is not limited thereto. For example, the nonvolatile memory device 1220 may be a planar-type memory device. The nonvolatile memory device 1220 may be coupled with the nonvolatile memory interface 1217 through a plurality of channels.

The buffer 1230 may temporarily store data to be written to the nonvolatile memory device 1220 or data read out from the nonvolatile memory device 1220. While the buffer 1230 is illustrated as being a DRAM, the inventive concept is not limited thereto. For example, the buffer 1230 may be implemented with an SRAM or a combination of the DRAM and the SRAM. A data bus may be connected to various elements of the storage controller 1210 such as the processor 1211, the working memory 1212, the host interface 1215, the buffer manager 1216, and the nonvolatile memory interface 1217 for exchanging data between the elements.

Figure 3:
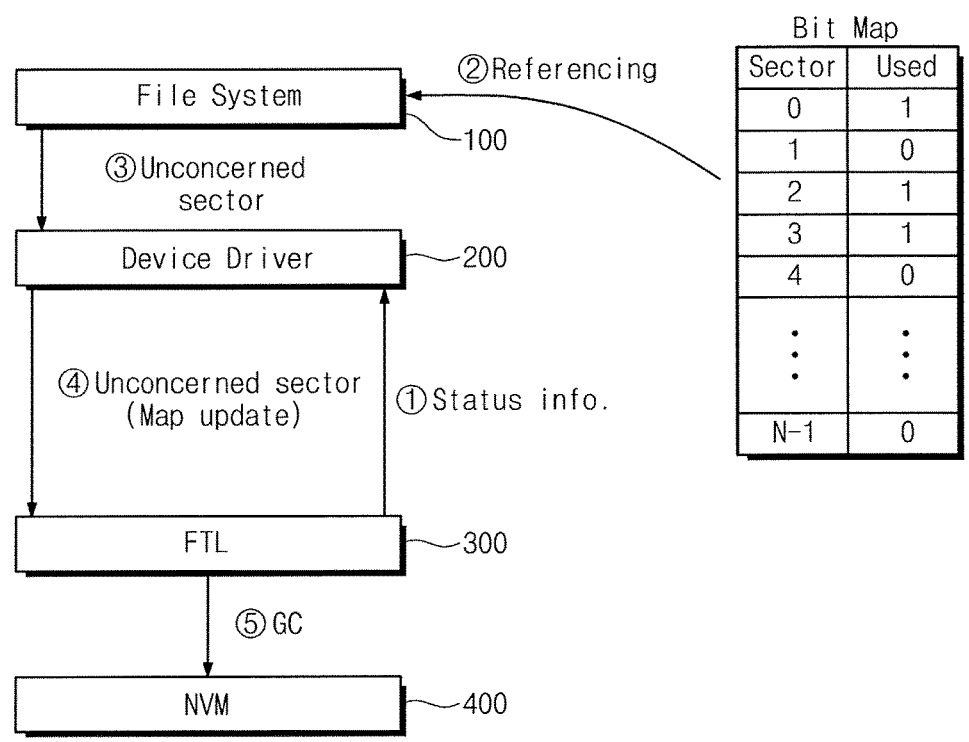
FIG. 3 is a block diagram schematically illustrating a hierarchical structure of software for driving data storage according to an exemplary embodiment of the inventive concept.

FIG. 3 is a block diagram schematically illustrating a hierarchical structure of software for driving data storage according to an exemplary embodiment of the inventive concept.

A flash translation layer 300 transfers status information of a nonvolatile memory device 400 to a device driver 200 (①). In an embodiment, the flash translation layer 300 is located in the storage controller 120, the nonvolatile memory device 400 corresponds to the nonvolatile memory device 1220, and the device driver 200 is located in the host 1100. The status information may indicate at least one of the number of reserved memory blocks of an over provisioning region 1222 of the nonvolatile memory device 400 or a degree of risk associated with entering into a write-protected mode. In an embodiment, the number of reserved memory blocks corresponds to the number of reserved memory blocks of the over provisioning region that are ready to be used for over provisioning operations and which have not been allocated to a non-over provisioning region.

The device driver 200 receiving the status information may check the status of the data storage 1200. That is, the device driver 200 may determine whether the data storage 1200 is currently operating in the write-protected mode or whether the data storage intends to enter (e.g., about to enter) the write-protected mode.

If the data storage 1200 is determined to be currently operating in the write-protected mode or intending to enter the write-protected mode, a file system 100 selects an unconcerned sector based on a bit map table (②) (e.g., see Bit Map illustrated in FIG. 2). In an embodiment, the file system is located within the host 1100. The bit map table may mean a table for defining a mapping relationship between files, managed by the file system 100, and sector addresses. For example, the bit map table may be stored at a host memory (not illustrated) and may be managed by a host. For example, the host memory may be located within the host 1100 or accessible to the host 1100 across a network. In an embodiment, the bit map table include information indicating whether a file (or data) corresponding to a specific sector is being used or not. For example, with regard to whether a file (or data) is being used, a sector marked by "1" may mean a sector is being used, whereas a sector marked by "0" may mean a sector is not being used. The file system 100 may select a sector not being used, based on the bit map table.

The file system 100 transfers a logical address (e.g., a logical page number (LPN)) corresponding to an unconcerned sector to the device driver 200 (③).

The device driver 200 transfers the logical address of the unconcerned sector received from the file system 100 to the flash translation layer 300 (④). In an embodiment, the flash translation layer applies the received address of the unconcerned sector to update the mapping table for defining a mapping relationship between logical addresses and physical addresses (e.g., physical page numbers (PPNs)). That is, a memory block, corresponding to the unconcerned sector, of the nonvolatile memory device is no longer used to store write data and is allocated to an over provisioning region.

The flash translation layer 300 may execute a garbage collection operation using a memory block corresponding to the unconcerned sector allocated to the over provisioning region (⑤). If a sufficient number of free blocks of the non-over provisioning region are secured through the garbage collection operation, the data storage 1200 may exit the write-protected mode. For example, if a first number of blocks corresponding to the unconcerned sector exist, garbage collection on the first number of blocks may result in a second number of free blocks, which is less than or equal to the first number. If this second number is larger than a reference value, the free blocks can be allocated to the non-over provisioning region so the data storage 1200 can exit the write-protected mode. Alternatively, if the data storage is determined as intending to enter the write-protected mode, it may be possible to delay entering into the write-protected mode for a substantial amount of time.

Figure 4:
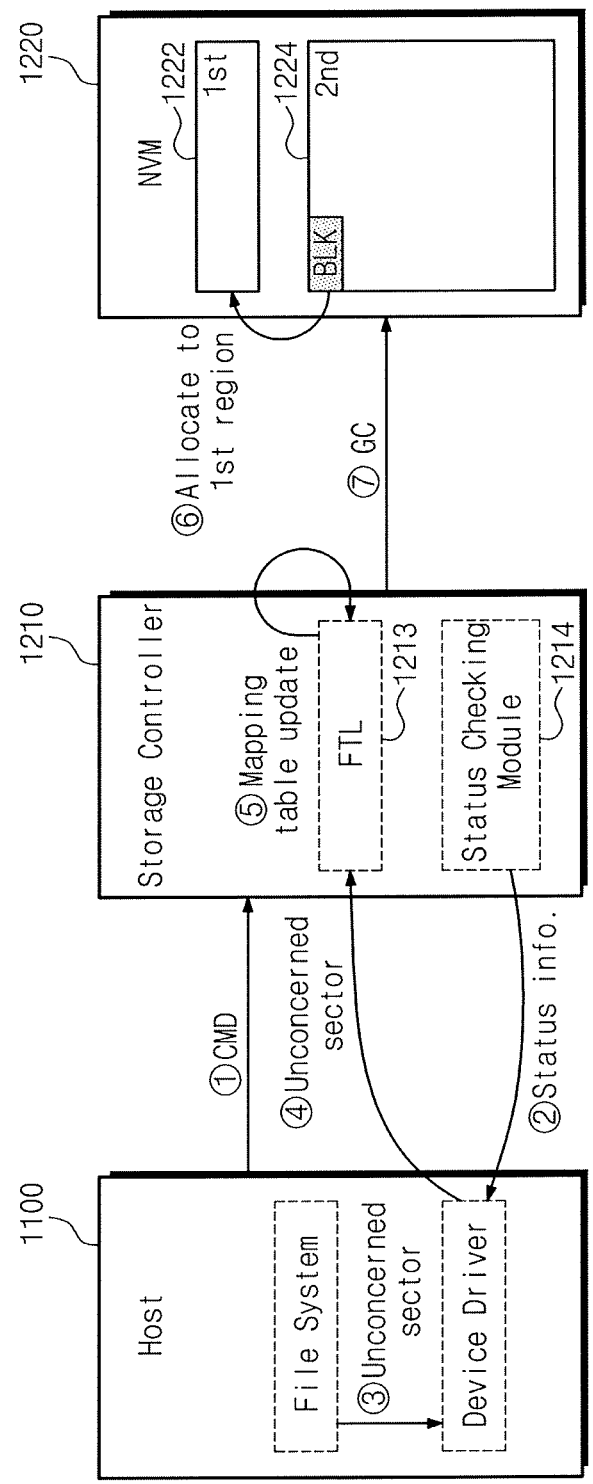
FIG. 4 is a block diagram schematically illustrating a method for controlling an over provisioning region according to an exemplary embodiment of the inventive concept.

FIG. 4 is a block diagram schematically illustrating a method for controlling an over provisioning region, according to an exemplary embodiment of the inventive concept.

A method for allocating a memory block belonging to a non-over provisioning region 1224 (i.e., a second region) to an over provisioning region 1222 (i.e., a first region) will be more fully described with reference to FIG. 4. That is, the method relates to a method for securing one or more reserved block(s) for the first region 1222 when the data storage 1200 has entered the write-protected mode or intends to enter the write-protected mode due to a lack of reserved memory blocks of the first region 1222 and free blocks of the second region 1224.

A host 1100 sends a command CMD for requesting status information of a nonvolatile memory device 1220 to a storage controller 1210 (①). For example, the command may be a SMART (Self-Monitoring, Analysis and Reporting Technology) command.

A status checking module 1214 driven on a storage controller 1210 transfers status information of a nonvolatile memory device 1220 to the host 1100 (②). The status information may include at least one of the number of reserved memory blocks of the first region 1222 of the nonvolatile memory device 1220 or a degree of risk associated with entering into a write-protected mode. Here, the degree of risk may indicate a probability of entering the write-protected mode. For example, as the number or a ratio of reserved memory blocks of the first region 1222 decreases, the probability of entering the write-protected mode becomes greater. In an embodiment, the ratio is ratio of the number of reserved memory blocks of the first region 1222 that are ready to be used for a provisioning operation to the number of reserved memory blocks that are not ready to be used for a provisioning operation. In an embodiment, the ratio is the ratio of the number blocks within the first region 1222 that have not been allocated to the second region 1224 to the number of blocks within the second region 1224 plus the number of blocks of the first region 1222 that have been allocated to the second region 1224.

The file system of the host 1100 determines whether the data storage 1200 has entered a write protected mode or intends to enter the write-protected mode, based on the received status information. For example, determination may be made based on the number of reserved memory blocks or a ratio of reserved memory blocks to memory blocks in the first region 1222. If the data storage 1200 is determined as having entered the write-protected mode or intending to enter the write-protected mode, the file system selects an unconcerned sector to transfer information of the selected unconcerned sector to the device driver (③).

The storage controller 1210 receives information on the unconcerned sector from the device driver of the host 1100 (④). The flash translation layer 1213 uses the information on the unconcerned sector to update a mapping table (⑤). A region corresponding to the unconcerned sector may be illustrated as being a shaded memory block BLK in the second region 1224.

The storage controller 1210 allocates the memory block BLK of the second region 1224 to the first region 1222 (⑥). That is, a memory block which has been allocated to store data is allocated to an over provisioning region.

The storage controller 1210 performs a garbage collection operation on memory blocks included in the second region 1224, using the memory block BLK allocated to the first region 1222 (⑦). An operation of physically erasing the memory block BLK allocated to the first region 1222 may be performed to perform garbage collection on memory blocks of the second region 1224.

If a garbage collection result indicates that the second region 1224 includes a sufficient number of free blocks, the data storage may exit the write-protected mode. Alternatively, if the data storage intends to enter the write-protected mode, the data storage may delay entering into the write-protected mode for a substantial amount of time. Whether the second region 1224 includes a sufficient number of free blocks may be determined based on various standards such as the number of free blocks or a ratio of free blocks to the whole memory blocks.

Figure 5:
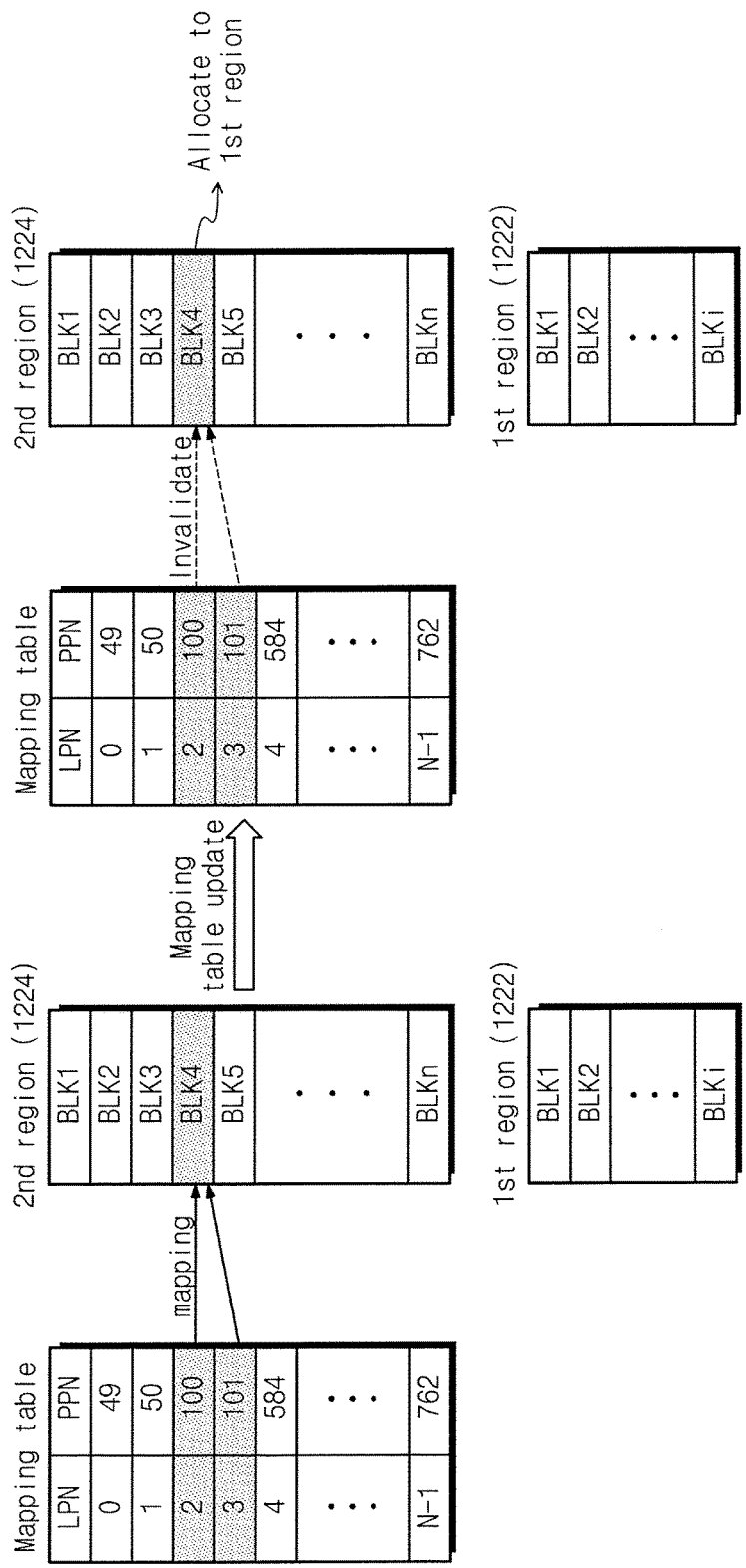
FIG. 5 is a table illustrating a procedure for updating a mapping table based on an address of an unconcerned sector, according to an exemplary embodiment of the inventive concept.

FIG. 5 is a table illustrating a procedure for updating a mapping table based on an address of an unconcerned sector, according to an exemplary embodiment of the inventive concept.

In FIG. 5, a mapping relationship between logical page numbers (LPNs) and physical page numbers (PPNs) is illustrated. It may be assumed that a first region 1222 for over provisioning does not include a reserved memory block or remains at a state where the number of reserved memory blocks is insufficient.

In a mapping table (a portion located at the left of FIG. 5) before updating of the mapping table, shaded logical and physical page numbers correspond to an unconcerned sector, and physical page numbers 100 and 101 correspond to a memory block BLK4 of a second region 1224 of a nonvolatile memory device. Accordingly, data stored at the memory block BLK4 may be unused or unnecessary data.

If a storage controller 1210 is provided with information on an unconcerned sector from a host 1100, a flash translation layer of the storage controller 1210 updates the mapping table. That is, the flash translation layer 1213 uses information associated with the unconcerned sector to invalidate a mapping relationship between a logical address and a physical address of the memory block BLK4. The storage controller 1210 allocates the memory block BLK4 of the second region 1224 to the first region 1222 for over provisioning.

The storage controller 1210 may perform a garbage collection operation on memory blocks of the second region 1224 using the memory block BLK4 allocated to the first region 1222. In an embodiment, an operation of physically erasing the memory block BLK4 thus allocated is performed first. If the second region 1224 is determined to include a sufficient number of free blocks, the data storage 1200 may exit a write-protected mode. Alternatively, if the data storage 1200 had intended to enter the write-protected mode, the data storage may delay entering into the write-protected mode for a substantial amount of time.

Figure 6:
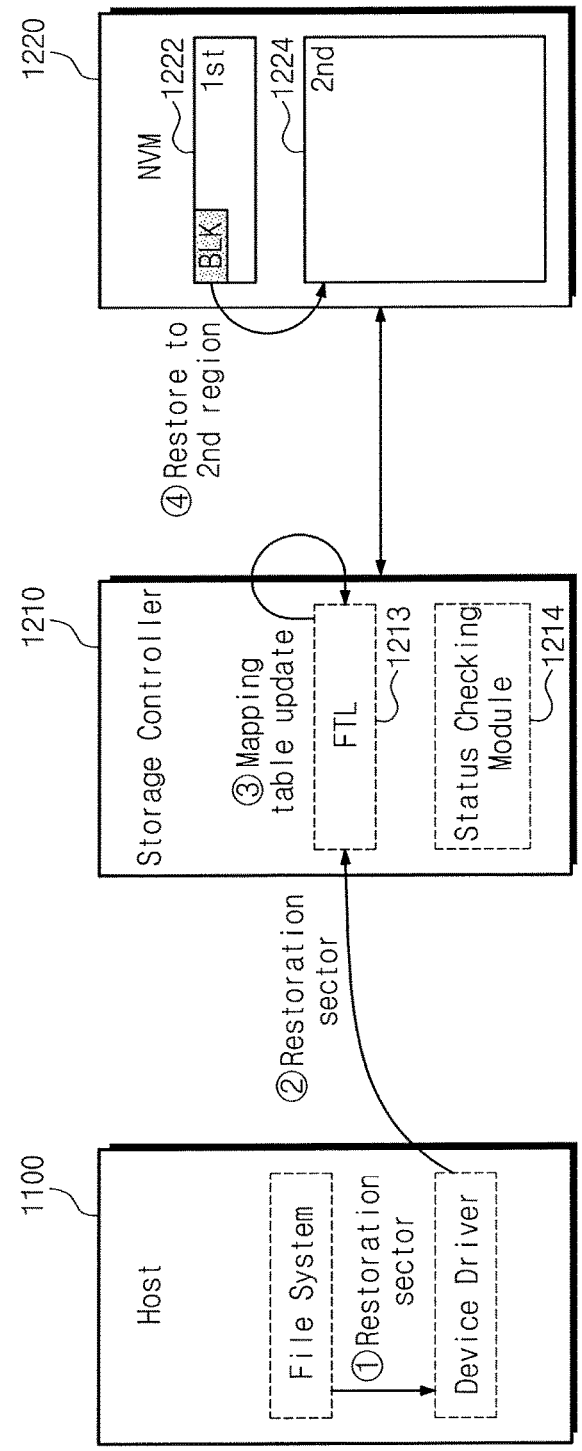
FIG. 6 is a block diagram schematically illustrating a method for controlling an over provisioning region, according to an exemplary embodiment of the inventive concept.

FIG. 6 is a block diagram schematically illustrating a method for controlling an over provisioning region, according to an exemplary embodiment of the inventive concept.

A method for restoring a memory block belonging to an over provisioning region 1222 (i.e., a first region) to a non-over provisioning region 1224 (i.e., a second region) will be more fully described with reference to FIG. 6. That is, the method relates to a method for securing a storage space by restoring a reserved block in the first region 1222 to the second region 1224 in the case where the second region 1224 at which data is stored does not include a sufficient number of free blocks.

A file system of a host 1100 determines whether restoration to the second region 1224 is required, based on the use rate of the file system. For example, the file system may determine that restoration to the second region 1224 is required when the use rate exceeds a specific threshold. When the use rate of the file system exceeds the specific threshold value, a storage space of the data storage may be insufficient. If the storage space of the data storage is determined to be insufficient, the host 1100 may select a sector to be restored. In an embodiment, the sector to be restored is selected from unconcerned sectors that were set to exit a write-protected mode or to delay entry into the write-protected mode. The host 1100 sends information of the sector to be restored to the storage controller 1210 (① and ②).

A flash translation layer 1213 of the storage controller 1210 updates a mapping table based on the information of the sector to be restored received from the host 1100 (③).

For example, the storage controller 1210 may randomly select memory blocks, of which the number corresponds to an address of the sector to be restored, from among memory blocks in the first region 1222 to allocate the selected memory blocks to the second region 1224. In an exemplary embodiment, the storage controller 1224 updates the mapping table by validating a mapping relationship between logical addresses and physical addresses of the selected memory blocks. As a result of updating the mapping table, a memory block BLK in the first region 1222 for over provisioning is restored to the second region 1224 (④). Since a memory block of the second region 1224 is secured, a data storage space may be extended (i.e., the use rate of the file system decreases).

The storage controller 1210 may determine whether to restore all or a portion of memory blocks in the first region 1222 corresponding to information of a sector to be restored. When restoration of the memory blocks in the first region 1222 to the second region 1224 would cause the data storage to enter the write-protected mode, it may be undesirable to perform such restoration.

In this case, the storage controller 1210 does not restore a memory block to the second region 1224. Alternatively, a minimum number of memory blocks are restored so as not to enter the write-protected mode. For example, if it is determined that restoring a first number of memory blocks would cause the data storage to enter the write-protected mode, a second number of memory blocks lower than the first is restored.

Figure 7:
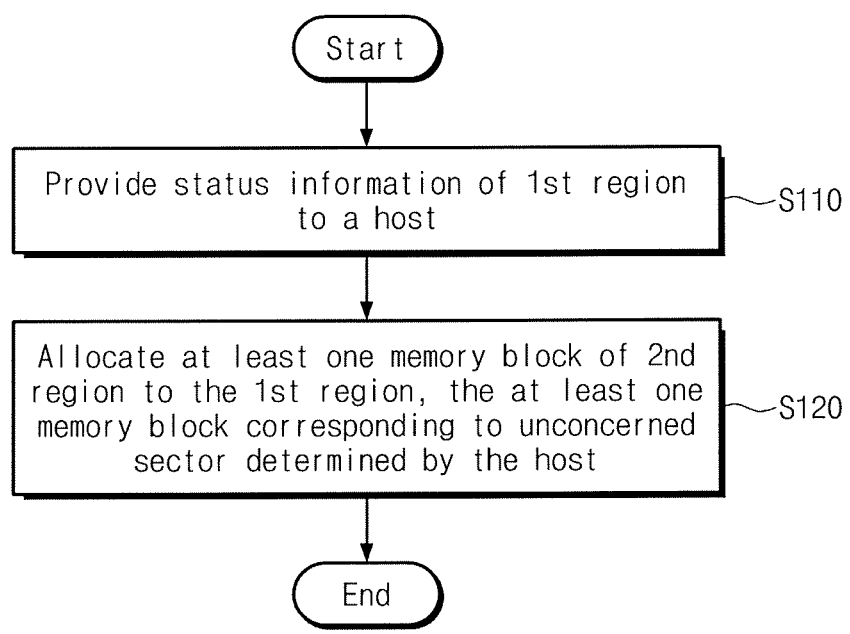
FIG. 7 is a flow chart schematically illustrating a method for controlling an over provisioning region, according to an exemplary embodiment of the inventive concept.

FIG. 7 is a flow chart schematically illustrating a method for controlling an over provisioning region, according to an exemplary embodiment of the inventive concept.

Since a flow chart illustrated in FIG. 7 relates to a method for allocating a memory block to an over provisioning region, data storage may remain in a write-protected mode or remain in a state indicating the data storage intends to enter the write-protected mode.

In step S110, a storage controller provides a host with status information of a nonvolatile memory device. The storage controller may transfer the status information in response to a command (e.g., an SMART command) from the host. The status information may include at least one of the number of reserved memory blocks of a first region 1222 (refer to FIG. 6) of the nonvolatile memory device or a degree of risk associated with entering into the write-protected mode.

In step S120, the storage controller allocates a memory block of a second region 1224 (refer to FIG. 6), at which data is stored, to the first region 1222 for over provisioning. In an embodiment, the allocated memory block is a memory block corresponding to an unconcerned sector determined by the host. Free blocks may be sufficiently prepared at the second region 1224 by performing garbage collection with respect to memory blocks included in the second region 1224, using the memory block allocated to the first region 1222.

According to an exemplary embodiment of the inventive concept, when a data storage remains in the write-protected mode, it may be possible to exit the write-protected mode without an artificial operation of a user (e.g., artificial file deletion). Alternatively, if the data storage intends to enter the write-protected mode, it may be possible to delay entering into the write-protected mode for a substantial amount of time. According to the above description, it may be possible to improve the reliability of the data storage.

Figure 8:
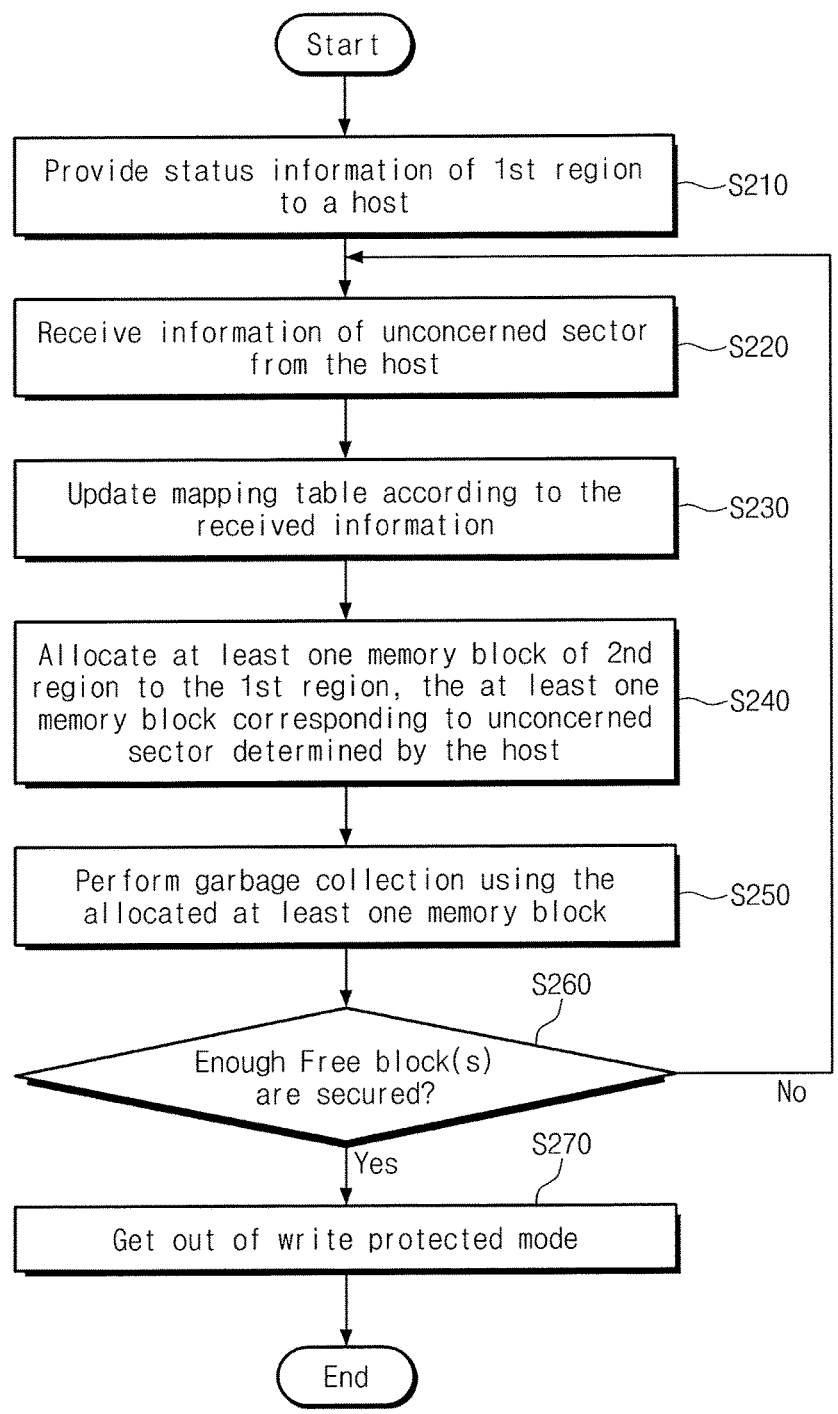
FIG. 8 is a flow chart schematically illustrating a method for controlling an over provisioning region, according to an exemplary embodiment of the inventive concept.

FIG. 8 is a flow chart schematically illustrating a method for controlling an over provisioning region, according to an exemplary embodiment of the inventive concept. An example where the data storage enters a write-protected mode will be more fully described with reference to FIG. 8.

In step S210, a storage controller provides a host with status information of a nonvolatile memory device. Step S210 may be similar to step S110 of FIG. 7, and thus a duplicated description is omitted.

In step S220, the storage controller receives information associated with an unconcerned sector from a host. The unconcerned sector may be selected by a host when data storage remains in the write-protected mode or intends to enter the write-protected mode. For example, the unconcerned sector may be selected by a file system of the host.

In step S230, the storage controller updates a mapping table between logical and physical addresses corresponding to the unconcerned sector, based on information on the unconcerned sector received from the host. As a result of the mapping table being updated, a memory block at which data corresponding to the unconcerned sector is stored is invalidated. No data may be programmed at the invalidated memory block.

In step S240, the storage controller allocates the invalidated memory block of a second region 1224 (refer to FIG. 6) to a first region 1222 (refer to FIG. 6). In an embodiment, a memory block allocated to the first region 1222 is a memory block corresponding to an unconcerned sector determined by the host.

In step S250, garbage collection on a memory block in the second region 1224 is performed using the memory block allocated to the first region 1222. An operation of physically erasing the memory block allocated to the first region 1222 may be performed first. Accordingly, it may be possible to secure a sufficient number of free blocks in the second region 1224.

In step S260, it is determined whether the second region 1224 includes a sufficient number of free blocks. Whether free blocks are sufficiently secured may be determined based on various standards such as the number of free blocks and a ratio of free blocks to the whole memory blocks. Operation divergence may occur according to the determination result. If the determination result indicates that free blocks are sufficiently secured (Yes), the method proceeds to step S270. Otherwise, the method proceeds to step S220, such that the above-described operations are iterated to secure free blocks sufficiently.

In step S270, data storage exits the write-protected mode. Since the second region 1224 includes free blocks sufficiently, the data storage may store write data from an outside source.

Figure 9:
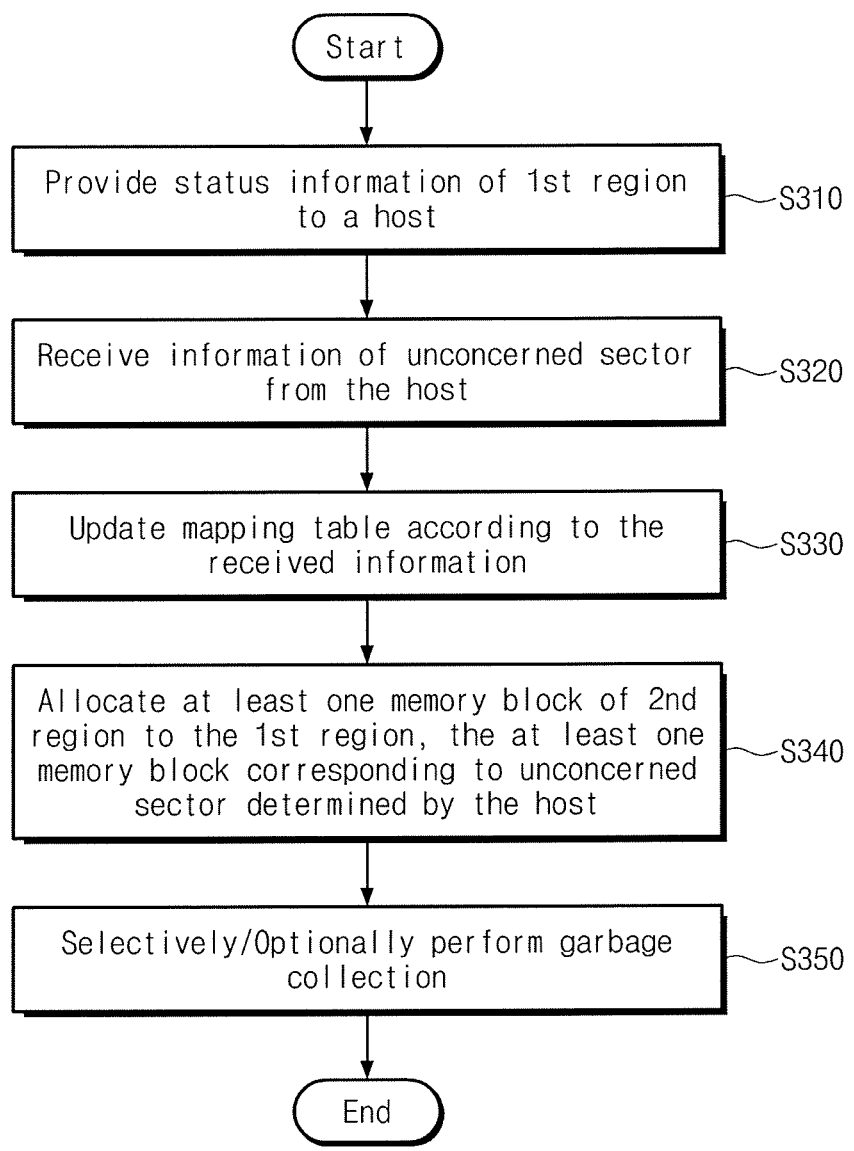
FIG. 9 is a flow chart schematically illustrating a method for controlling an over provisioning region, according to an exemplary embodiment of the inventive concept.

FIG. 9 is a flow chart schematically illustrating a method for controlling an over provisioning region, according to an exemplary embodiment of the inventive concept.

An example where data storage intends to enter a write-protected mode will be more fully described with reference to FIG. 9. In an embodiment, the data storage intends to enter a write-protected mode when the amount of space of a second region 1224 (refer to FIG. 6) needed to store data is insufficient and a first region 1222 (refer to FIG. 6) does not include a sufficient number of reserved memory blocks.

In step S310, a storage controller provides a host with status information of a nonvolatile memory device.

In step S320, the storage controller receives information on the unconcerned sector from the host. The unconcerned sector may be selected by the host in an example where data storage remains in a write-protected mode or intends to enter the write-protected mode. For example, the unconcerned sector may be selected by a file system of the host.

In step S330, the storage controller updates a mapping table between logical and physical addresses corresponding to the unconcerned sector, based on information on the unconcerned sector received from the host. As a result of the mapping table being updated, a memory block at which data corresponding to the unconcerned sector is stored is invalidated. No data may be programmed at the invalidated memory block.

In step S340, the storage controller allocates the invalidated memory block of the second region to the first region. In an embodiment, the memory block allocated to the first region is a memory block corresponding to an unconcerned sector determined by the host.

In step S350, garbage collection is executed selectively or optionally. That is, unlike the where data storage entered the write-protected mode, the garbage collection is selectively performed because the data storage does not enter the write-protected mode. Accordingly, entering into the write-protected mode may be delayed for a substantial amount of time.

Figure 10:
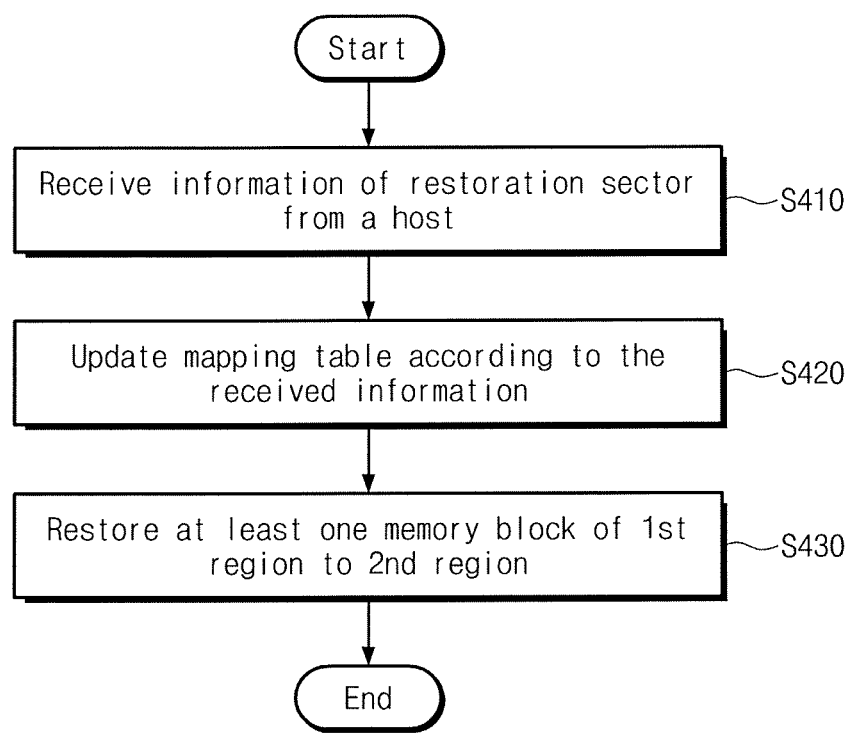
FIG. 10 is a flow chart schematically illustrating a method for controlling an over provisioning region, according to an exemplary embodiment of the inventive concept.

FIG. 10 is a flow chart schematically illustrating a method for controlling an over provisioning region, according to an exemplary embodiment of the inventive concept. A method for allocating a memory block in a first region to a second region will be more fully described with reference to FIG. 10.

In step S410, a storage controller receives information on a sector to be restored from a host. The sector to be restored may be selected by a host. The sector to be restored may be selected from unconcerned sectors set to exit from a write-protected mode or to delay entering into the write-protected mode.

In step S420, the storage controller updates a mapping table based on information of the sector to be restored thus received.

In step S430, a memory block in a first region 1222 (refer to FIG. 6) is restored to a second region 1224 (refer to FIG. 6). Since a memory block of the second region 1224 is secured, a data storage space may be extended (i.e., the use rate of a file system decreases).

An example where the data storage enters the write-protected mode by restoring memory blocks in the first region 1222 corresponding to the sector to be restored to the second region 1224 may be undesirable. Accordingly, to prevent the data storage from entering the write-protected mode, the storage controller does not restore memory blocks in the first region corresponding to the sector to be restored or restores only a portion of the memory blocks.

According to an exemplary embodiment of the inventive concept, it is possible to adjust the number of reserved memory blocks in an over provisioning region of the data storage, thereby making it possible to prevent the data storage from entering a write-impossible state due to entering into the write-protected mode and to secure a storage space of the data storage using the over provisioning region.

Figure 11:
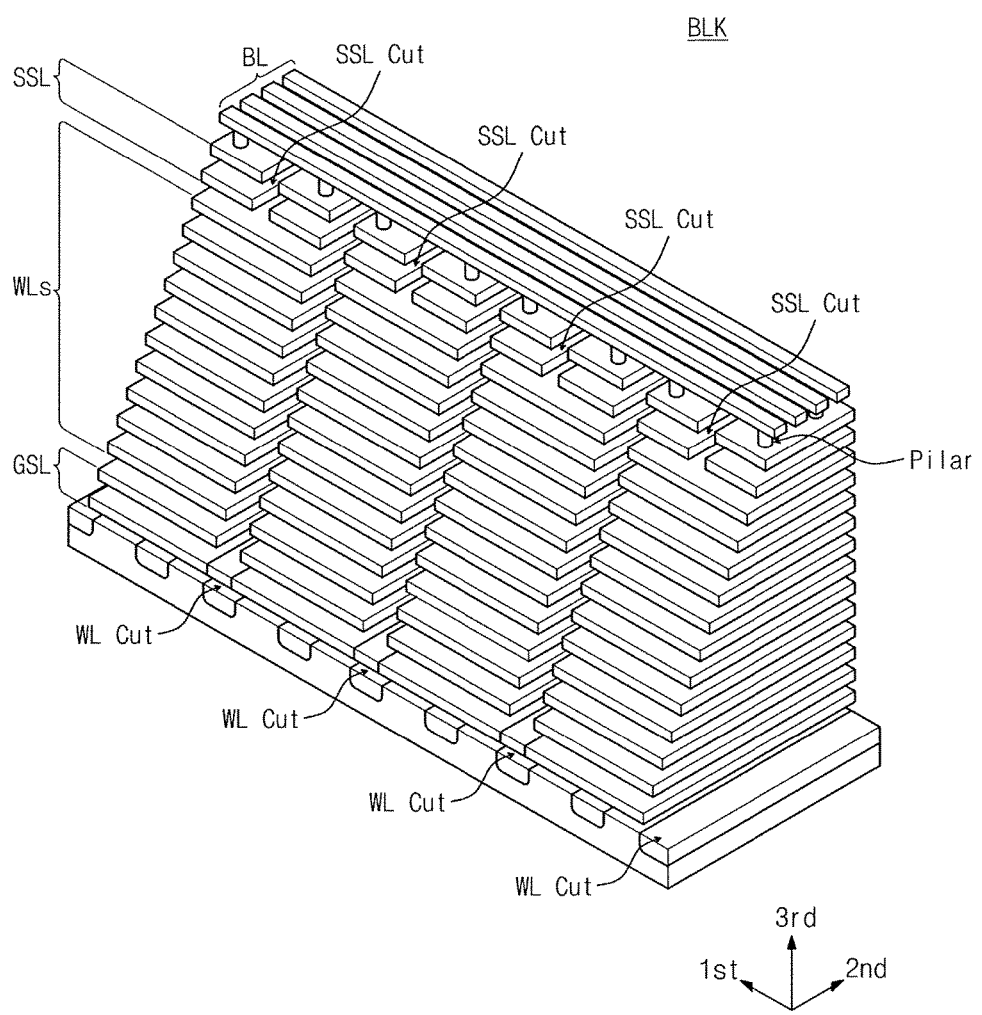
FIG. 11 is a perspective view of a memory block of data storage according to an exemplary embodiment of the inventive concept.

FIG. 11 is a perspective view of a memory block of the data storage according to an exemplary embodiment of the inventive concept. Referring to FIG. 11, four sub blocks are formed on a substrate. The sub blocks may be formed by stacking and cutting at least one ground selection line GSL, a plurality of word lines, and at least one string selection line SSL on the substrate in the form of layer. The at least one string selection line SSL may be separated by string selection line cuts. Each word line cut may include a common source line (CSL) although not shown in FIG. 11. A string may be formed by making a pillar connected to a bit line penetrate the at least one string selection line SSL, the word lines, and the at least one ground selection line GSL.

In FIG. 11, a sub block according to an embodiment of the inventive concept is exemplified as a structure between word line cuts that are adjacent to each other. However, the scope and spirit of the inventive concept is not limited thereto. For example, a structure between a word line cut and a string selection line cut may be defined as a sub block.

The memory block BLK according to an embodiment of the inventive concept is implemented to have a merged word line structure where two word lines are merged to one word line.

Figure 12:
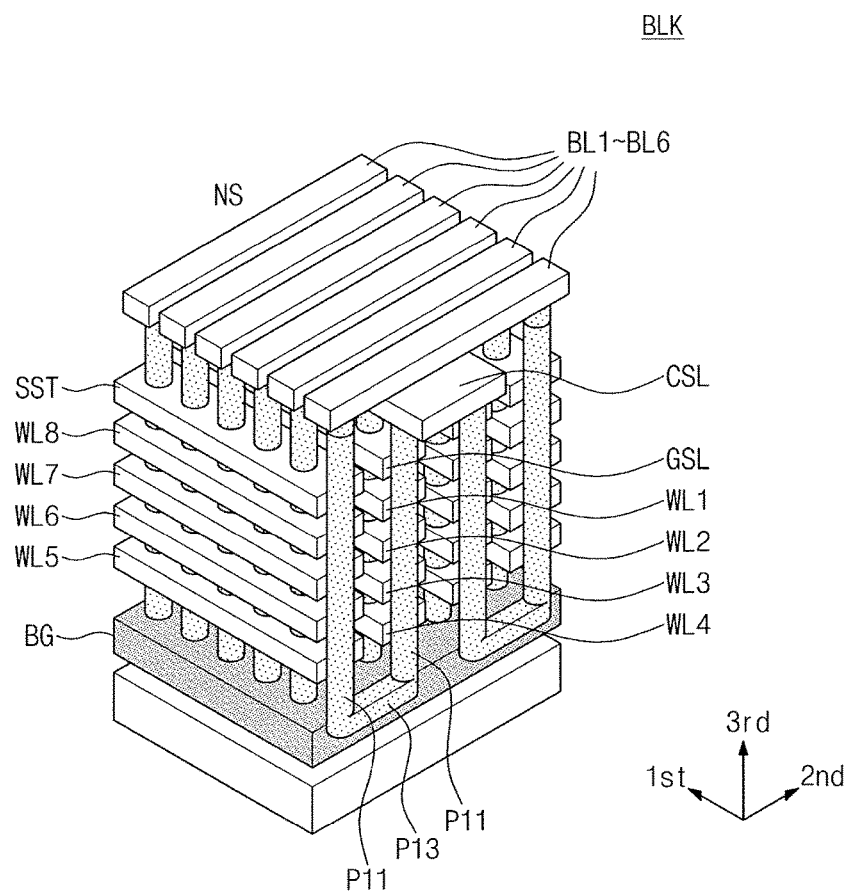
FIG. 12 is a perspective view of a memory block of data storage according to a exemplary embodiment of the inventive concept.

FIG. 12 is a perspective view of a memory block of data storage according to an exemplary embodiment of the inventive concept. For easy of understanding, it is assumed that the number of word line layers is 4. Referring to FIG. 4, a memory block BLK is implemented to have a PBiCS (pipe-shaped bit cost scalable) structure in which lower ends of adjacent memory cells connected in series are connected through pipes. A memory block contains m-by-n strings NS (n and m being a natural number).

In FIG. 12, m=6 and n=2. Each string NS may contain several memory cells that are connected in series. First upper ends of the memory cells may be connected to string selection transistors SST, second upper ends thereof may be connected to ground selection transistors, and lower ends thereof may be connected through pipes.

In each string NS, memory cells may be formed so as to be stacked on a plurality of semiconductor layers. Each string NS may contain a first pillar P11, a second pillar P12, and a pillar connection portion P13 connecting the first and second pillars P11 and P12. The first pillar P11 may be connected to a bit line (e.g., BL1) and the pillar connection portion P13 and may be formed to penetrate a string selection line SSL and word lines WL5 through WL8. The second pillar P12 may be connected to a common source line CSL and the pillar connection portion P13 and may be formed to penetrate a ground selection line GSL and word lines WL1 through WL4. As illustrated in FIG. 12, each string NS may be implemented with a U-shaped pillar.

For example, a back-gate BG may be formed on a substrate, and the pillar connection portion P13 may be embedded in the back-gate BG. For example, the back-gate BG may be used in common in the block BLK. The back-gate BG may be separated from a back-gate of another block.

The inventive concept is applicable to an eMMC (e.g., an embedded multimedia card), moviNAND, and iNAND.

Figure 13:
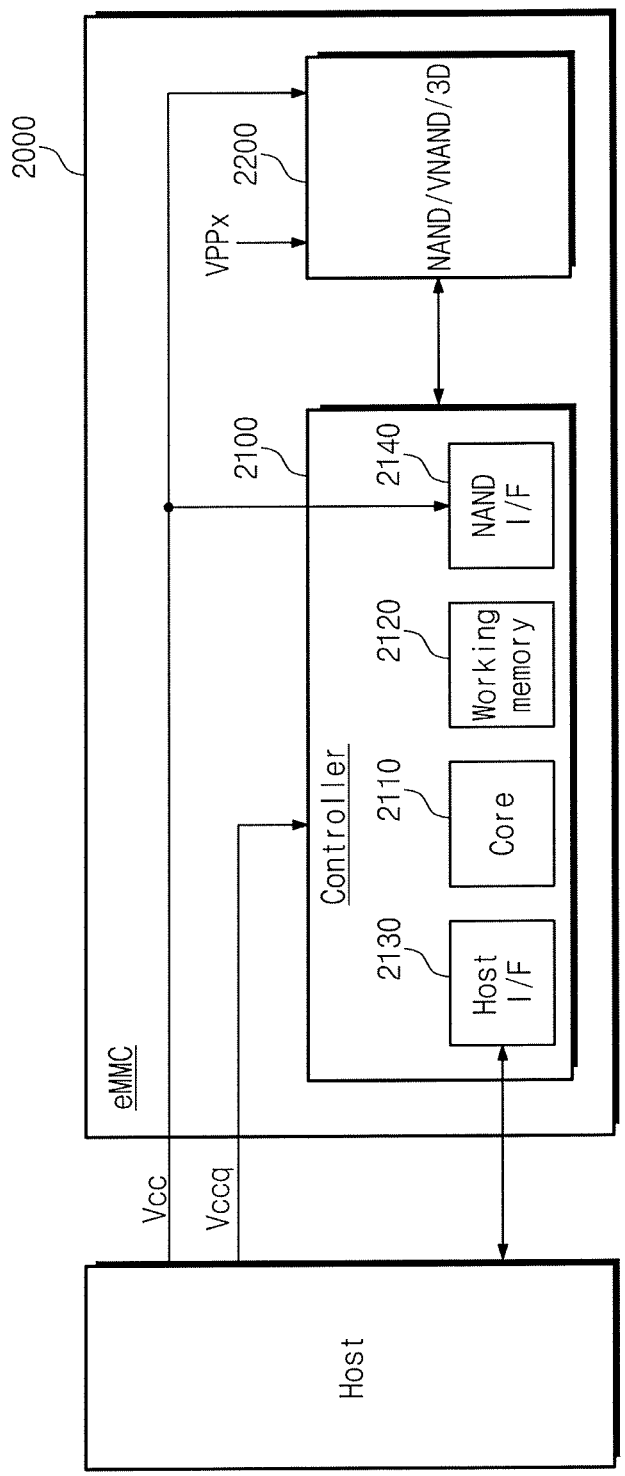
FIG. 13 is a block diagram schematically illustrating an eMMC according to an exemplary embodiment of the inventive concept.

FIG. 13 is a block diagram schematically illustrating an eMMC according to an exemplary embodiment of the inventive concept. Referring to FIG. 13, an eMMC 2000 includes a controller 2100 and at least one NAND flash memory device 2200.

The controller 2100 may be connected to a NAND flash memory device 2200 through a channel. The controller 2100 includes at least one controller core 2110, a working memory 2120, a host interface 2130, and a NAND interface 2140. The at least one controller core 2110 may control an overall operation of the eMMC 2000. The host interface 2130 may act as an interface between the controller 2100 and a host. A flash translation layer or a status checking module according to an exemplary embodiment of the inventive concept is loaded in the working memory 2120. The NAND interface 2140 may provide an interface between the NAND flash memory device 2200 and the controller 2100. For example, the host interface 2130 may be a parallel interface (e.g., an MMC interface). In other exemplary embodiments, the host interface 2130 of the eMMC 2000 may be a serial interface (e.g., UHS-II, UFS interface, and the like). For example, the host interface 2130 may be a NAND interface.

The eMMC 2000 receives power supply voltages Vcc and Vccq from the host. Here, the power supply voltage Vcc (e.g., about 3.3 V) is supplied to the NAND flash memory device 2200 and the NAND interface 2140, and the power supply voltage Vccq (e.g., about 1.8 V/3.3 V) is supplied to the controller 2100. In an exemplary embodiment, the eMMC 2000 is optionally supplied with an external high voltage.

The inventive concept is applicable to Universal Flash Storage (UFS).

Figure 14:
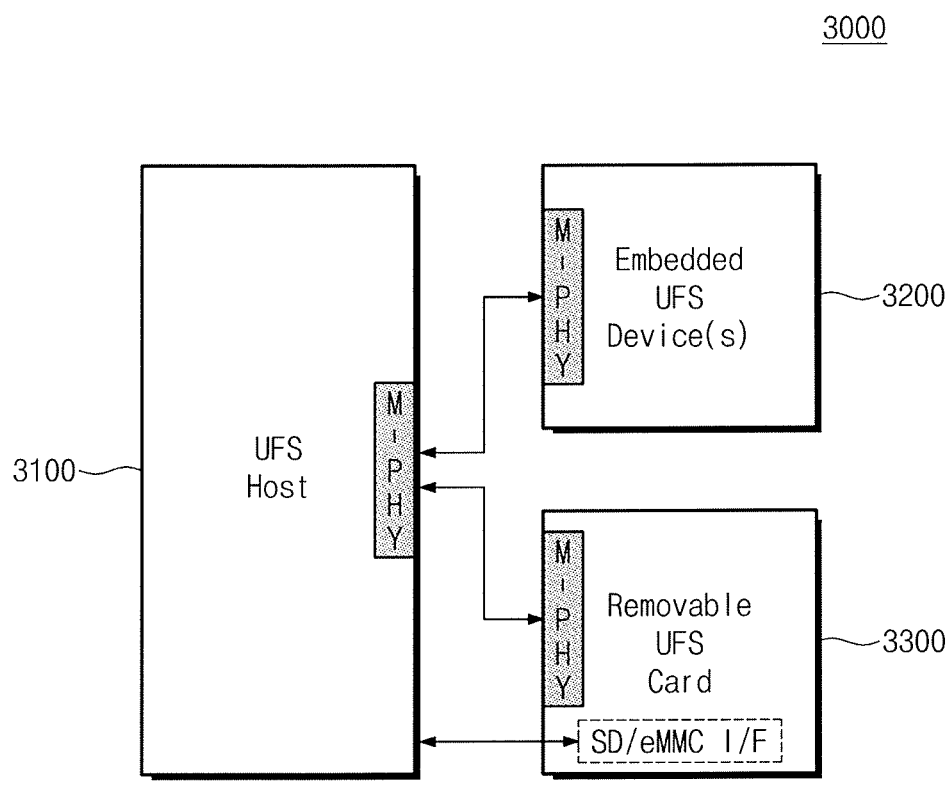
FIG. 14 is a block diagram schematically illustrating a UFS system according to an exemplary embodiment of the inventive concept.

FIG. 14 is a block diagram schematically illustrating a UFS system according to an exemplary embodiment of the inventive concept. Referring to FIG. 14, a UFS system 3000 includes a UFS host 3100, an embedded UFS device 3200, and a removable UFS card 3300. Communication between the UFS host 3100 and the embedded UFS device 3200 and communication between the UFS host 3100 and the removable UFS card 3300 may be performed through M-PHY layers.

At least one of the embedded UFS device 3200 or the removable UFS card 3300 may be implemented to perform "allocation" and "restoration" according to an exemplary embodiment of the inventive concept. That is, the allocation and restoration may be implemented such that UFS exits a write-protected mode or delays entering into the write-protected mode.

In an embodiment, each of the UFS host 3100 and the removable UFS card 3300 includes a bridge that communicates with each other based on a protocol different from the UFS protocol. The UFS host 3100 and the removable UFS card 3300 may communicate through various card protocols (e.g., UFDs, MMC, SD (secure digital), mini SD, Micro SD, etc.).

Figure 15:
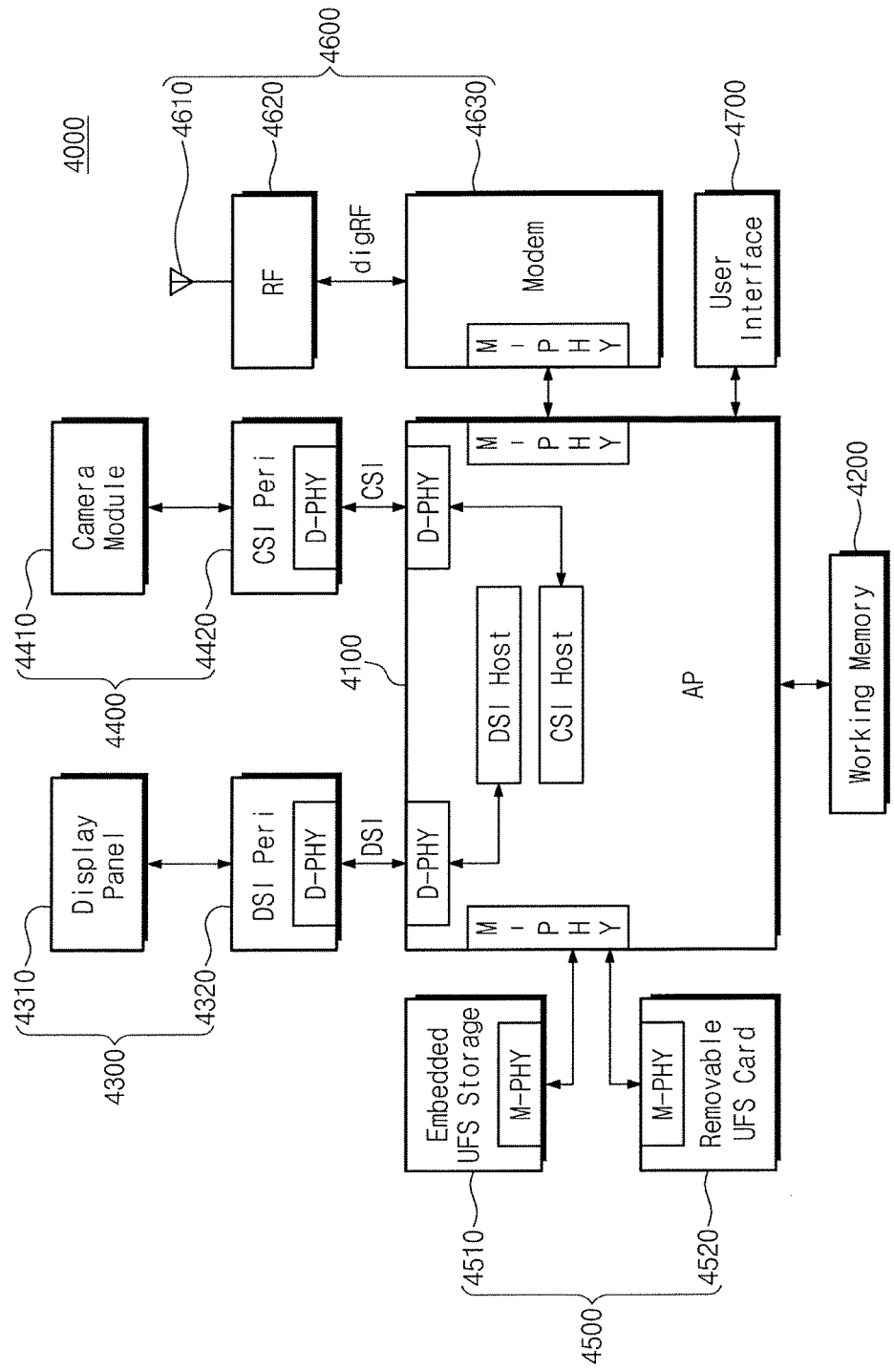
FIG. 15 is a block diagram schematically illustrating a mobile device to which the inventive concept is applied.

FIG. 15 is a block diagram schematically illustrating a mobile device to which the inventive concept may be applied. Referring to FIG. 15, a mobile device 4000 may be configured to support the MIN (mobile industry processor interface) standard or the eDP (Embedded DisplayPort) standard. The mobile device 4000 includes an application processor 4100, a working memory 4200, a display unit 4300, an image processing unit 4400, data storage 4500, an RF transceiver unit 4600, and a user interface 4700.

The application processor 4100 may control an overall operation of the mobile device 4000.

The working memory 4200 may be used to load various applications for driving the mobile device 4000. The working memory 4200 may include at least one of a cache memory, a DRAM, an SRAM, a PRAM, or a flash memory device.

The display unit 4300 includes a display panel 4310 and a DSI (display serial interface) peripheral circuit 4320. The display panel 4310 may display image data. A DSI host embedded in the application processor 4100 may perform serial communication with the display panel 4310 through DSI. The DSI peripheral circuit 4320 may include the following components needed to drive the display panel 4310: a timing controller, a data driver, and the like.

The image processing unit 4400 includes a camera module 4410 and a CSI (camera serial interface) peripheral circuit 4420. The camera module 4410 and the CSI peripheral circuit 4420 may include a lens, an image sensor, an image processor, and the like. Image data that the camera module 4410 generates may be processed by the image processor, and the processed image may be transferred to the application processor 4100 through CSI.

The data storage 4500 includes embedded UFS storage 4510 and a removable UFS card 4520. The embedded UFS storage 4510 and the removable UFS card 4520 may perform communication with the application processor 4100 through an M-PHY layer. A host (the application processor 4100) may include a bridge that is configured to communicate using a protocol different from the UFS protocol. Communications between the application processor 4100 and the removable UFS card 4520 may be performed in compliance with various card protocols (e.g., UFDs, MMC, eMMC SD (secure digital), mini SD, Micro SD, and the like.

At least one of the embedded UFS device 4510 or the removable UFS card 4520 may be implemented to perform "allocation" and "restoration" according to an exemplary embodiment of the inventive concept. That is, the allocation and restoration may be implemented such that the data storage 4500 exits a write-protected mode or delays entering into the write-protected mode. Each of the embedded UFS device 4510 or the removable UFS card 4520 may be implemented with a three-dimensional nonvolatile memory device in which a memory cell string is formed to be perpendicular to a substrate.

The RF transceiver unit 4600 includes an antenna 4610, an RF unit 4620, and a modem 4630. While the modem 4630 is illustrated as communicating with the application processor 4100 through an M-PHY layer, embodiments of the inventive concept are not limited thereto. According to an exemplary embodiment, the modem 4630 is embedded in the application processor 4100.

According to an exemplary embodiment of the inventive concept, it may be possible to adjust the number of reserved memory blocks belonging to an over provisioning region of data storage, thereby preventing the data storage from entering a write-impossible state due to entering into the write-protected mode and to extend a data storage space using reserved memory blocks.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A data storage device comprising:
   a nonvolatile memory device including a plurality of memory blocks divided into a first region which is an over provisioning region and a second region for storing data; and
   a storage controller configured to output status information about the first region to a host, receive an address of an unconcerned sector of the second region from the host in response to output of the status information, and allocate at least one memory block, corresponding to the unconcerned sector, from among memory blocks of the second region to the first region using the received address,
   wherein the first and second regions are distinct from one another.

2. The data storage device of claim 1, wherein the storage controller provides the host with the status information of the first region in response to a command from the host.

3. The data storage device of claim 2, wherein the status information indicates a number of reserved memory blocks in the first region.

4. The data storage device of claim 3, wherein the address is received when the number of reserved memory blocks is smaller than a reference value, and wherein the reserved memory blocks are used for maintenance of the data storage device.

5. The data storage device of claim 1, wherein the storage controller performs a garbage collection operation on memory blocks of the second region using the at least one memory block allocated to the first region.

6. The data storage of claim 1, wherein the storage controller allocates the at least one memory block, corresponding to the unconcerned sector, to the first region by invalidating a mapping relationship between a logical address and a physical address corresponding to the unconcerned sector, where the logical address is the received address.

7. The data storage device of claim 1, wherein the storage controller restores at least one memory block of the first region to the second region by validating a mapping relationship between a logical address, corresponding to a restoration sector, and a physical address of the at least one memory block to be restored, wherein the restoration sector is set based on a use rate of a file system by a host.

8. The data storage device of claim 7, wherein the restoration sector corresponds to at least one memory block to be restored to the second region among memory blocks included in the first region.

9. The data storage device of claim 1, wherein the over provisioning region is used for maintenance of the data storage device including at least one of TRIM, garbage collection, and replacement of a bad block.

10. The data storage device of claim 1, wherein the nonvolatile memory device is a three-dimensional nonvolatile memory device in which a memory cell string is formed to be perpendicular to a substrate.

11. The data storage device of claim 2, wherein the status information indicates a probability of entering into a write-protected mode, and the data storage operates in a read-only mode during the write-protected mode.

12. The data storage device of claim 1, wherein data not used by a file system of the host is stored at the at least one memory block corresponding to the unconcerned sector.

13. A method of operating a data storage device, the method comprising:
    outputting, by a storage controller of the data storage device, status information of a first region of a nonvolatile memory device allocated for over provisioning to a host in response to a command from the host;
    receiving, by the storage controller, an address of an unconcerned sector of the first region from the host in response to output of the status information,
    allocating, by the storage controller, at least one memory block, corresponding to the unconcerned sector, from among memory blocks of a second region of the nonvolatile memory device to the first region using the first address,
    wherein the first and second regions are distinct from one another.

14. The method of claim 13, wherein the status information indicates a number of reserved memory blocks of the first region, and wherein the address is received when the number of reserved memory blocks is smaller than a reference value.

15. The method of claim 14, further comprising:
    performing a garbage collection operation on memory blocks of the second region using the at least one memory block allocated to the first region.

16. The method of claim 15, further comprising:
    decreasing the number of reserved memory blocks of the first region based on a use rate of a file system of the host, and
    wherein the number of the reserved memory blocks decreases as the use rate of the file system increases.

17. The method of claim 16, wherein the nonvolatile memory device is a three-dimensional nonvolatile memory device in which a memory cell string is formed to be perpendicular to a substrate.

18. The method of claim 13, wherein the status information indicates a probability of entering into a write-protected mode.

* * * * *